(12) United States Patent
Tateyama

(10) Patent No.: US 8,023,123 B2
(45) Date of Patent: Sep. 20, 2011

(54) INFORMATION PROCESSING APPARATUS, CONTROL METHOD FOR INFORMATION PROCESSING APPARATUS, DISPLAY APPARATUS, AND CONTROL METHOD FOR DISPLAY APPARATUS

(75) Inventor: Jiro Tateyama, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 989 days.

(21) Appl. No.: 11/871,792

(22) Filed: Oct. 12, 2007

(65) Prior Publication Data

US 2008/0094652 A1    Apr. 24, 2008

(30) Foreign Application Priority Data

Oct. 23, 2006  (JP) ................................. 2006-287449

(51) Int. Cl.
  *G06F 3/12*   (2006.01)
  *H04N 7/00*   (2011.01)
(52) U.S. Cl. ...................... 358/1.13; 358/1.15; 348/552
(58) Field of Classification Search ................. 358/1.13, 358/1.15; 348/552; 400/62
  See application file for complete search history.

(56) References Cited

U.S. PATENT DOCUMENTS

| | | | |
|---|---|---|---|
| 7,020,839 B1 * | 3/2006 | Hosoda | ......................... 715/234 |
| 2003/0002056 A1 | 1/2003 | Yamaguchi et al. | |
| 2003/0034989 A1 | 2/2003 | Kondo | |
| 2004/0139463 A1 * | 7/2004 | Aratani et al. | .................. 725/37 |
| 2004/0190015 A1 | 9/2004 | Uchida | |
| 2007/0253026 A1 | 11/2007 | Sakuda et al. | |

FOREIGN PATENT DOCUMENTS

| | | |
|---|---|---|
| JP | 2000-112691 A | 4/2000 |
| JP | 2001-265545 A | 9/2001 |
| JP | 2002-063013 A | 2/2002 |
| JP | 2003-054066 A | 2/2003 |
| JP | 2003-067185 A | 3/2003 |
| JP | 2004-213450 A | 7/2004 |
| JP | 2006-106846 A | 4/2006 |

* cited by examiner

*Primary Examiner* — Benny Tieu
*Assistant Examiner* — Sunil Chacko
(74) *Attorney, Agent, or Firm* — Canon USA Inc. IP Division

(57) ABSTRACT

An apparatus receives printing structured document data relating to data broadcasting, that has been described in a markup language. The received printing structured document data is parsed, and layout information for printing is extracted. The descriptions relating to printing that are included in the printing structured document data are changed into descriptions which can be parsed by a browser application capable of displaying contents described in a markup language, using the layout information. Thus, when printing data broadcast data in digital broadcasting, a suitable preview display can be made of printing data which has been generated from printing structured document data described in a markup language, using browser functions of a digital TV, before performing printing output of printing data.

6 Claims, 13 Drawing Sheets

CSSPP

@page{ size:210mm 297mm;margin:3mm;}

@media screen{body {font-size:12pt} }
@media print{body{font-size:9pt}}

CSS2 body{ font-size:-9pt}
div.all{ width:210mm; margin:3mm;}

XHTML Basic

```
<body>
<div class="all">
  ⋮
  ⋮
</div>
</body>
```

CSS2

```
h2{
border-left:solid 2em;
border-bottom: solid 2pt;
padding:0.2em;
}
h2#c1{
border-left-color:#009999;
border-bottom-color:#009999;
}
```

XHTML Basic

```
<h2 id="c1">PAGE BREAK</h2>
```

PAGE BREAK

INFORMATION PROCESSING APPARATUS, CONTROL METHOD FOR INFORMATION PROCESSING APPARATUS, DISPLAY APPARATUS, AND CONTROL METHOD FOR DISPLAY APPARATUS

BACKGROUND OF THE INVENTION

1. Field of the Invention

The present invention relates to an information processing apparatus (e.g., printer), a control method for the information processing apparatus, a display apparatus (e.g., digital TV broadcasting receiver), and a control method for display apparatus, for previewing print data generated from printing structured document data described in a markup language, before printout of the print data.

2. Description of the Related Art

There have been known information processing apparatus which generate print data based on printing structured document data described in a markup language. A well-known example of such an information processing apparatus is a printing apparatus configured to handle digital TV broadcasting (hereafter referred to simply as "printer").

Japanese digital TV broadcasting includes so-called data broadcasting. The ARIB (Association of Radio Industries and Businesses) has stipulated that printing services should be able to be provided using this data broadcasting framework (hereafter referred to as data broadcasting printing).

Two general types of data broadcasting printing exist. The first method involves a digital TV broadcasting receiver receiving the actual printing contents included in data broadcasting data multiplexed with the broadcast waves, and transferring the printing contents to a printer. The printer uses the actual printing contents received and generates print data. Hereinafter, this method will be referred to as the "print file method".

The second method involves a digital TV broadcasting receiver receiving address information indicating where the printing contents are stored, and transferring the address information to the printer. The printer which has received the address information obtains the actual printing contents based on the address information, and generates printing data. Hereinafter, this method will be referred to as the "print URI method".

Standards for Japanese data broadcasting stipulate using a page description language (markup language) for data broadcasting called BML (Broadcast Markup Language). BML has been formulated based on XML (extensible Markup Language). The ARIB stipulates that data broadcasting printing is to conform to XHTML (extensible HyperText Markup Language)-Print and CSS (Cascading Style Sheets) Print Profile. XHTML-Print stipulates elements and attributes of print data. Also, CSS Print Profile (hereafter abbreviated to "CSSPP") stipulates the layout, font size, and so forth of print data. That is to say, the printing contents data includes printing structured document data such as XHTML files and CSS files. Also, depending on the contents, MonoMedia data such as JPEG files or PNG files regarding which a path is described in the XHTML file is included. Hereinafter, description will be made with the understanding that printing contents data includes at least printing structured document data.

With both the above described print file method and print URI method, the printer generates the final print data. This is also as stipulated. That is to say, the printer parses XHTML files and CSS files, and performs rendering to generate bitmap data. Accordingly, digital TV broadcasting receivers such as digital TV sets basically are not provided with functions to parse printing contents and generate image data. Accordingly, in the event that the user desires to display an outline of the print data on the screen of the digital TV as a preview, a conceivable arrangement would be for the printer to generate printing image data, and transmit the printing image data to the digital TV. This method has been disclosed in Japanese Patent Laid-Open No. 2000-112691.

BML browser applications and HTML browser applications (hereafter referred to simply as "browser") implemented in current digital TV broadcasting receivers are capable of displaying BML contents in normal data broadcasting and HTML contents ordinarily on the Internet, respectively. However, it has been difficult for such browsers to display printing structured document data encoded with XHTML-Print or CSSPP.

One reason is that parsing and rendering XHTML files for previewing requires a great amount of memory and CPU power. While digital TV broadcasting receivers do have memory and CPUs, previewing would require additional memory capacity and CPU power, increasing of which may not be feasible.

A second reason is that even if one attempted to display printing structured document data encoded with XHTML-Print or CSSPP using a BML browser or HTML browser, these browsers cannot suitably parse elements and attributes dependent on printing processing. Consequently, the display would be of a different layout and display from the actual print data, meaning that the preview does not work.

Further, with the method disclosed in Japanese Patent Laid-Open No. 2000-112691, even in cases of just performing a preview, the printer has to first generate the print data, and then generate image data such as a BMP image or JPEG image. This leads to an increase in both processing time and processing load, and further, the printer needs an encoder and memory for generating data.

SUMMARY OF THE INVENTION

According to a first aspect of the present invention, an embodiment is directed to an apparatus (e.g., digital TV printer) including: a reception unit configured to receive printing structured document data, relating to data broadcasting, that has been described in a markup language; a parsing unit configured to parse the printing structured document data, and extract layout information relating to printing; and a changing processing unit configured to change printing-related description contents included in the printing structured document data into a description which can be parsed by a browser application capable of displaying markup language, using the layout information.

According to a second aspect of the present invention, an embodiment is directed to a method including: receiving of printing structured document data, relating to data broadcasting, that has been described in a markup language; parsing of the printing structured document data, and extracting layout information relating to printing; and changing of printing-related description contents included in the printing structured document data into a description which can be parsed by a browser application capable of displaying markup language, using the layout information.

According to an embodiment, the printing structured document data may be configured of first structured document data stating elements and attributes of the printing data, and second structured document data stating layout and font size of the printing data; wherein the layout information is extracted in the parsing, by parsing the second structured document data; and wherein the description content of the first structured document data and the second structured document data is changed in the changing processing, using the layout information extracted in the parsing.

According to an embodiment, a description indicating page break position may be added to the first structured document data in the changing processing. Also, structured document data, of which the description has been changed in the changing processing, may be uploaded to a server, so as to be accessible from other external apparatuses.

According to a third aspect of the present invention, an embodiment is directed to an apparatus (e.g., digital TV broadcasting receiver) which is connectable to a printer via a network and which is capable of receiving data broadcasting. The apparatus includes: a transmission unit configured to transmit printing structured document data or URI information indicating where printing structured document data is saved, included in received data broadcasting data, to the printer; an issuing unit configured to issue commands instructing generating of printing preview contents data to the printer; and a control unit configured to activate a browser application capable of parsing structured document data described in HTML, so as to access printing preview contents data generated at the printer; wherein the control unit controls the browser application so as to access an address corresponding to printing preview contents data, that has been notified from the printer beforehand.

According to a fourth aspect of the present invention, an embodiment is directed to a method for an apparatus which is connected to a printer via a network and which is capable of receiving data broadcasting. The method includes: transmitting of printing structured document data or URI information indicating where printing structured document data is saved, included in received data broadcasting data, to the printer; issuing of commands instructing generating of printing preview contents data to the printer; activating of a browser application capable of parsing structured document data described in HTML, so as to access printing preview contents data generated at the printer; and controlling the browser application so as to access an address corresponding to printing preview contents data, that has been notified from the printer beforehand.

Thus, when printing data broadcast data in digital broadcasting, before performing printing output of printing data generated from printing structured document data described in a markup language, a suitable preview display can be made of the printing data using the browser function of the digital TV.

Further features of the present invention will become apparent from the following description of exemplary embodiments (with reference to the attached drawings).

DESCRIPTION OF THE EMBODIMENTS

Exemplary embodiments of the present invention will now be described in detail in accordance with the accompanying drawings.

Figure 1:
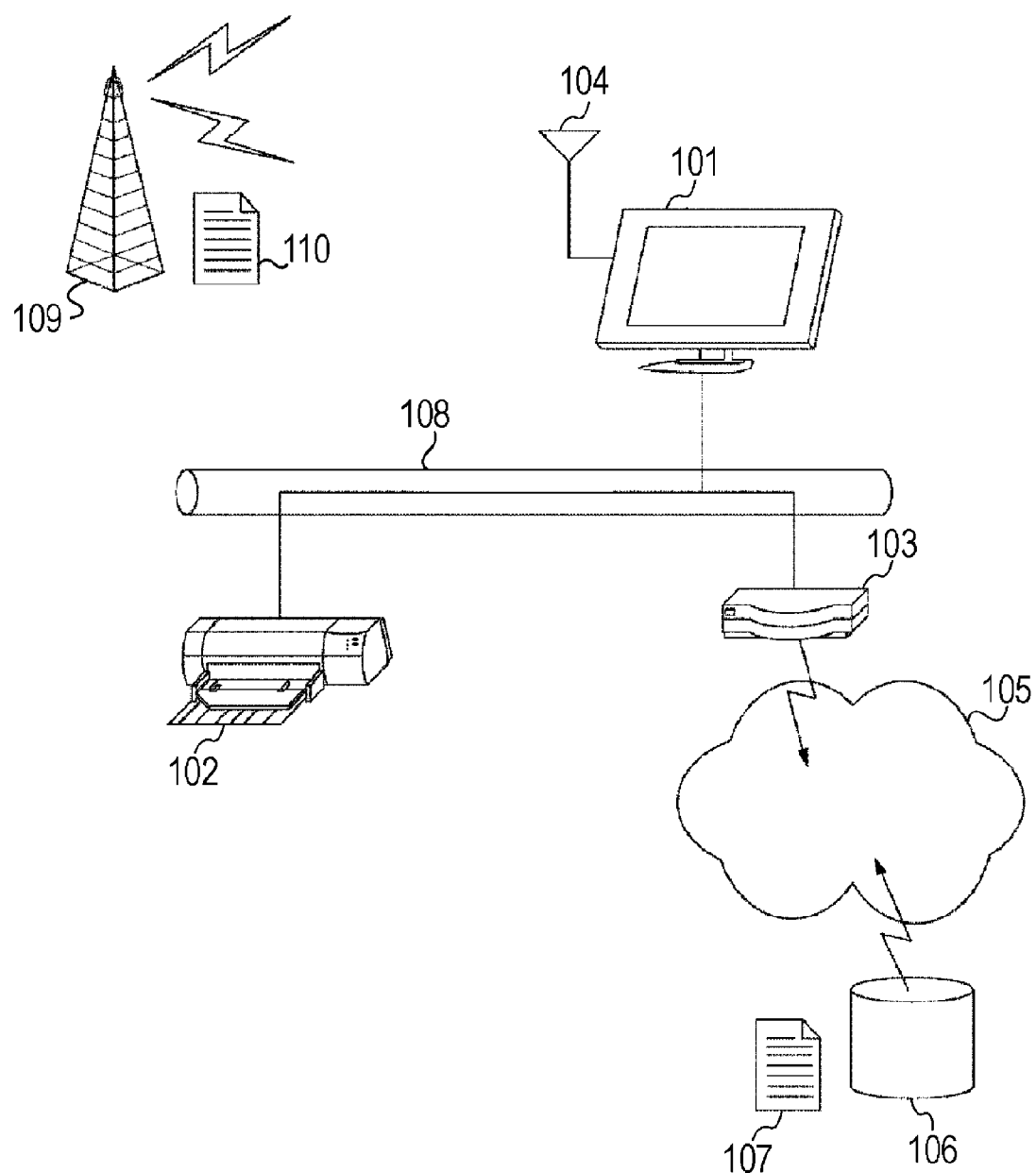
FIG. 1 is a conceptual diagram illustrating a data broadcasting printing environment according to an embodiment of the present invention.

FIG. 1 is a diagram illustrating a data broadcasting printing environment according to an embodiment of the present invention. A digital TV broadcasting receiver (hereafter referred to as "DTV") 101 and a digital TV printer (hereafter referred to as "DTV printer") 102 are communicably connected by a home network 108. Also, the home network 108 can connect to the Internet 105 via a router 103. That is to say, the DTV 101 and DTV printer 102 can access a Web server 106 via the Internet 105. Also, the DTV printer 102 can obtain printing contents 107 saved on the Web server 106.

The DTV 101 is capable of receiving digital broadcasting from a broadcasting station 109, via an antenna 104. Also, as described above, the DTV 101 is capable of obtaining the printing contents data 110 transmitted by using the data broadcasting portion of digital broadcasting. Further, the printing contents data 110 can be transferred to the DTV printer 102 via the home network 108.

Figure 2:
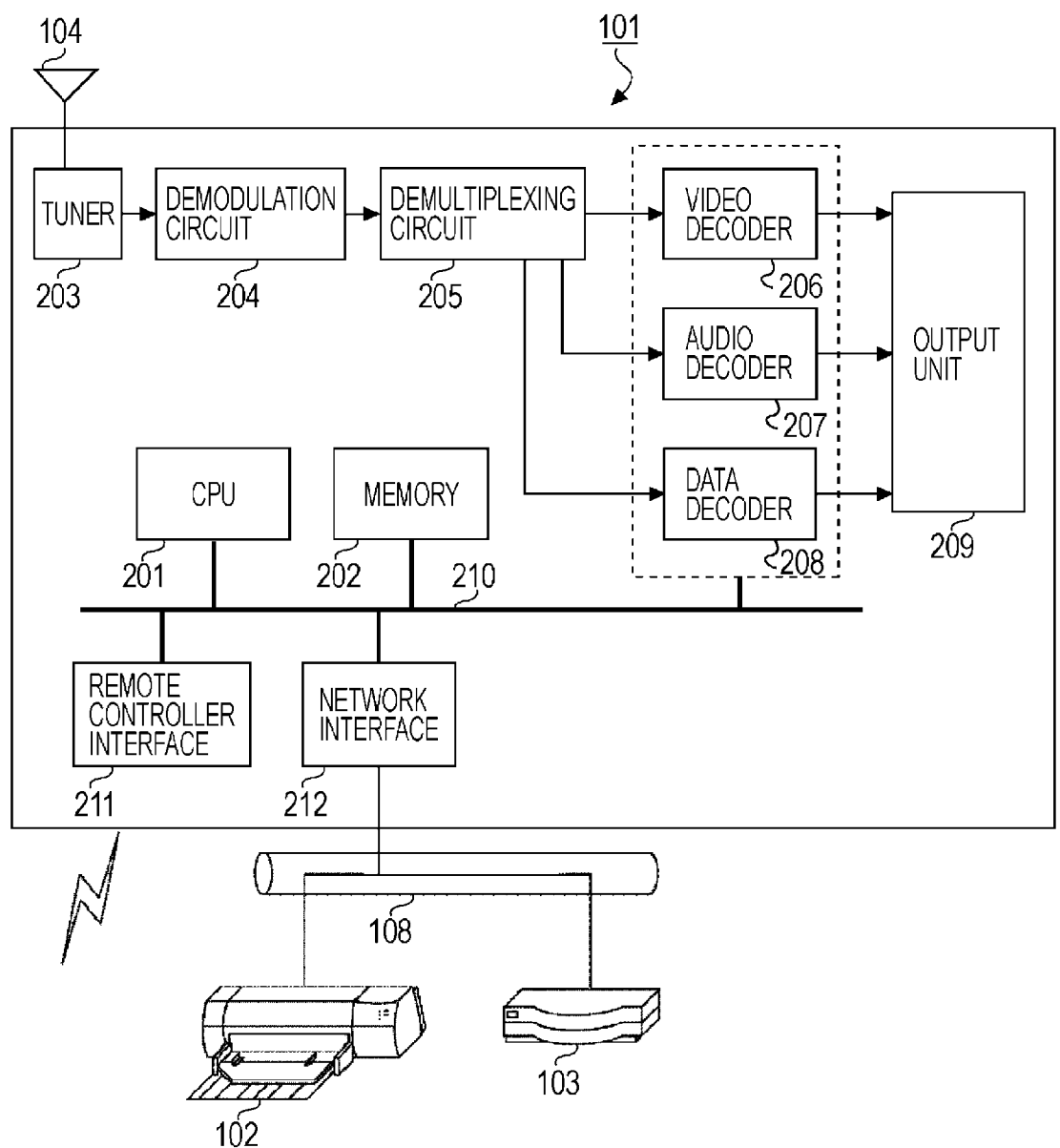
FIG. 2 is a functional block diagram for describing the internal structure of a DTV according to an embodiment of the present invention.

Next, the configuration of the DTV 101 will be described with reference to FIG. 2. FIG. 2 is a functional block diagram for describing the internal structure of the DTV 101. The DTV 101 includes a CPU 201 for controlling the entire DTV, and memory 202 used for storing and running control programs. The CPU 201 and memory 202 are connected to a remote controller interface 211 and network interface 212 via an internal bus 210. The remote controller interface 211 is an interface for executing communication with an unshown remote controller device. Also, the network interface 212 is an interface for executing communication with the DTV printer 102 and router 103 via the above-described home network 108.

Broadcast waves received with the antenna 104 are input to a tuner 203. The tuner 203 selectively outputs broadcast waves of a frequency specified by a tuning operation or the like, to a demodulation circuit 204. The demodulation circuit 204 demodulates the broadcast waves input thereto into MPEG-2 TS (Transport Stream). MPEG-2 TS is a data stream wherein video, sound, data, and so forth are encoded and multiplexed. A demultiplexing circuit 205 demultiplexes the MPEG-2 TS into packetized encoded data such as video PES (Packetized Elementary Stream), audio PES, and so forth. Also, section data such as IS (Service Information) which is used for generating closed caption data, EPG (Electronic Program Guide), and so forth, included in the TS, is also demultiplexed by the demultiplexing circuit 205.

The PES and section data demultiplexed at the demultiplexing circuit 205 are each input to a decoder unit. The decoder unit has a video decoder 206 for decoding a video PES into video signals, an audio decoder 207 for decoding an audio PES into audio signals, and a data decoder 208 for decoding section data.

The video signals and audio signals decoded at the decoder unit are subjected to image processing and audio processing respectively, and output to an output unit 209 including such as a monitor, speaker, or the like. Also, the decoded data is stored in memory and managed, and output to the output unit 209 under certain operations. For example, in the event that a user performs an operation to instruct display of closed caption, the closed caption data is synthesized with the video data and output. Also, in the event that the user performs an operation to instruct display of data broadcasting, the data broadcasting contents decoded at the data decoder 208 is parsed at a predetermined application, and displayed at the output unit 209 as a data broadcasting screen image.

Figure 3:
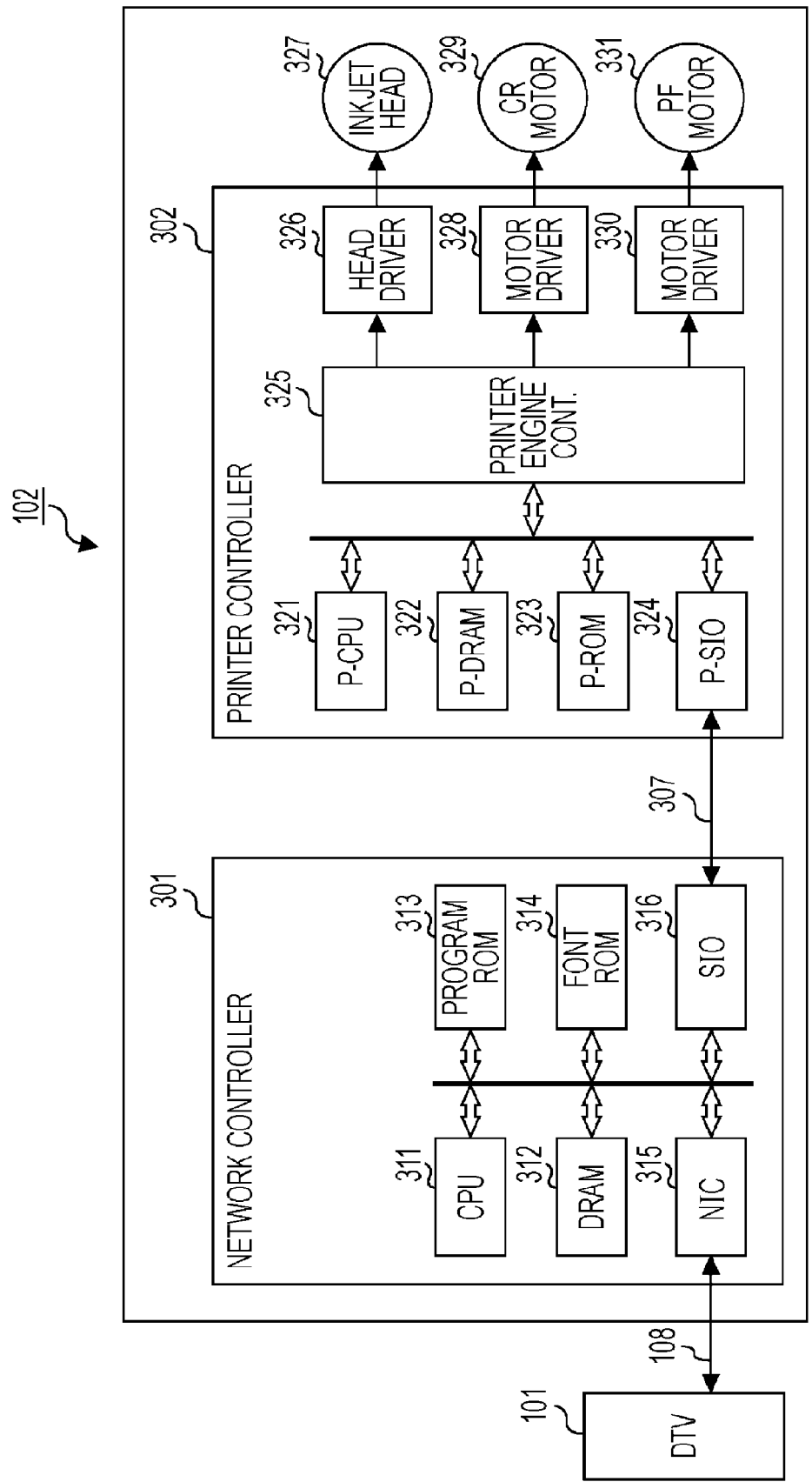
FIG. 3 is a functional block drawing for describing the internal configuration of a DTV printer according to an embodiment of the present invention.

Next, the configuration of the DTV printer 102 according to an embodiment will be described. FIG. 3 is a functional block diagram for describing the internal configuration of the DTV printer 102. The configuration of the DTV printer 102 connected to the DTV 101 via the network 108 is generally divided into a network controller 301 and printer controller 302.

The network controller 301 has a CPU 311 for performing control, and DRAM 312 used as buffer memory for temporarily storing received data, and as work memory. The network controller 301 also has a NIC (Network Interface Controller) 315 for performing communication with devices connected to the network 108, and further has program ROM 313 storing execution programs and font ROM 314 storing font data. Moreover, the network controller 301 has a serial I/O (Input/Output) 316 used for communication with the later-described printer controller 302. Note that these function blocks are connected by an internal bus of the network controller 301.

Next, the configuration of the printer controller 302 will be described. The printer controller 302 has a P-CPU 321 for performing control, P-DRAM 322 used as buffer memory for temporarily storing received data, and as work memory, and P-ROM 323 storing execution programs. The printer controller 302 also has a P-SI/O 324, which is a serial I/O at the printer controller side, for communicating with the network controller 301. These blocks are connected by an internal bus to a printer engine controller 325, which controls a head driver 326 for driving an ink jet head 27, a motor driver 328 for driving a carriage motor 329 which moves a head, and a motor driver 330 for driving a paper feed motor 331 which conveys paper sheets.

Now, as mentioned earlier, the data broadcasting printing as standardized by the ARIB stipulates that printing structured document data described in a markup language format is parsed, and printing data is generated, at the DTV printer 102. Accordingly, the flow of printing processing will be briefly described with the DTV printer 102 shown in FIG. 3 as an example. While there are two types of data broadcasting printing as mentioned earlier, the flow of printing processing with the print file method will be described here.

First, the printing contents data, which is the actual printing contents obtained by the DTV 101 via the network 108, is transmitted to the DTV printer 102.

The network controller 301 of the DTV printer 102 stores the transmitted printing contents data in the DRAM 312, and then parses any XHTML-Print files and CSSPP files, which are structured document data, included in the printing contents data. Following parsing of these files, rendering processing is performed to generate printing image data.

The printing image data generated at the network controller 301 is transferred to the printer controller 302 via the serial I/O. The printer controller 302 drives the printer under control of the printer engine controller 325 to print the printing image data transmitted thereto.

Figure 4:
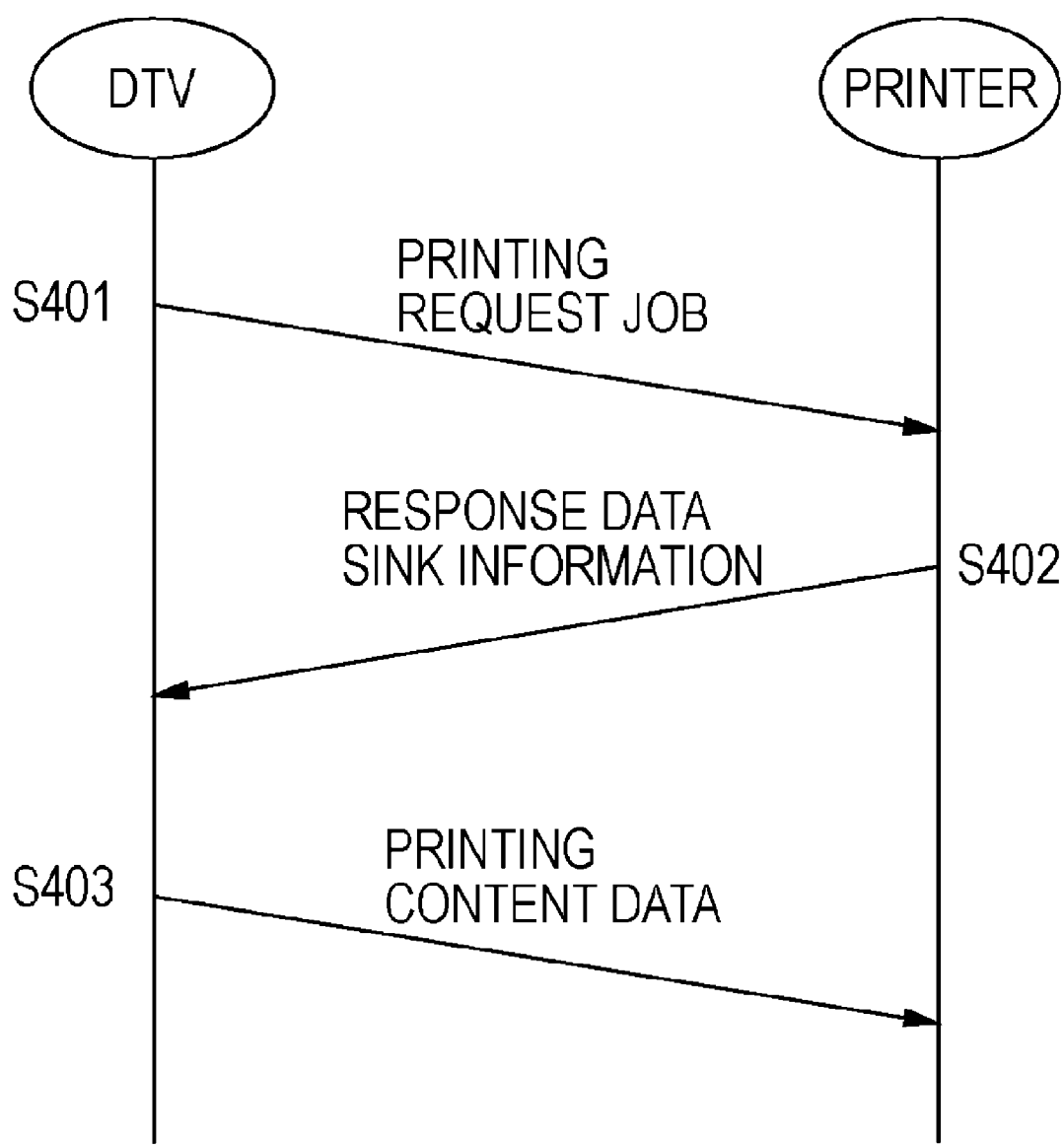
FIG. 4 is a flow diagram for describing a print file method for data broadcasting printing according to an embodiment of the present invention.
Figure 5:
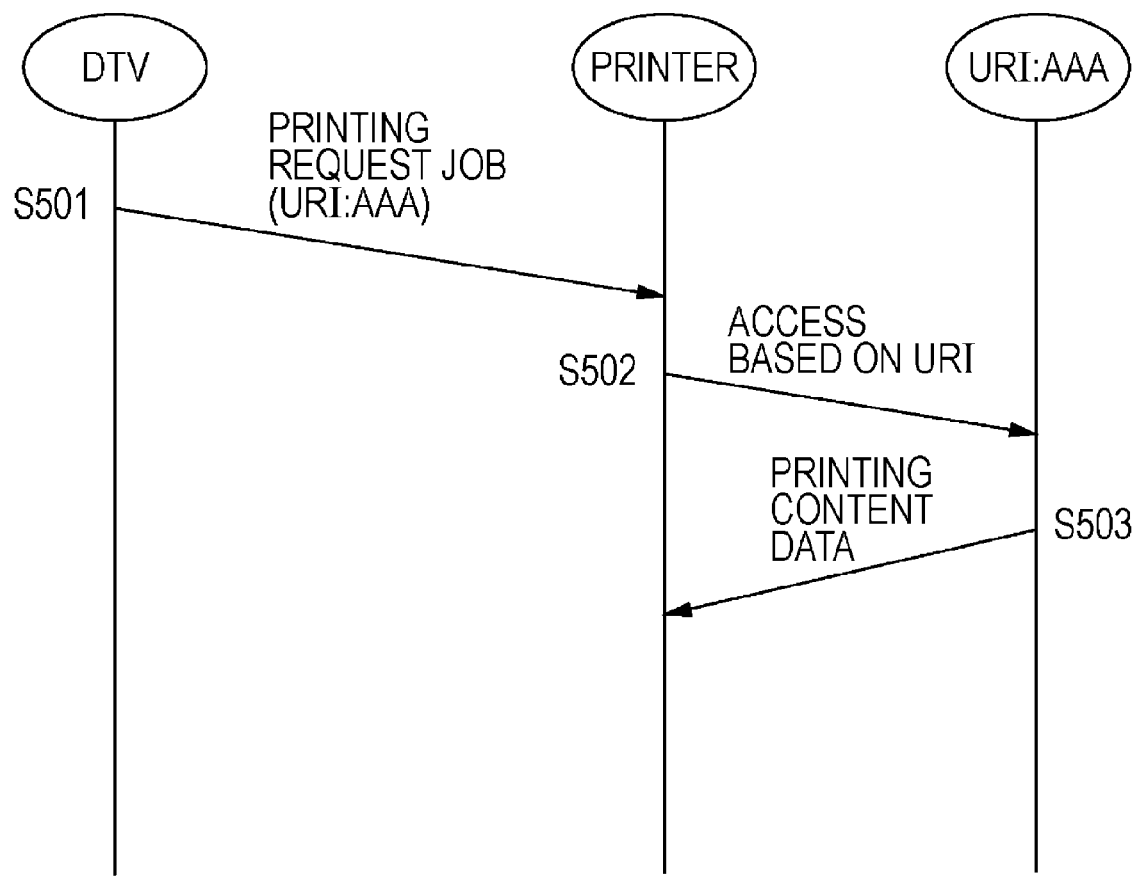
FIG. 5 is a flow diagram for describing a print URI method for data broadcasting printing according to an embodiment of the present invention.

FIGS. 4 and 5 are flow diagrams for describing the execution procedures for print file method and print URI method in data broadcasting printing.

FIG. 4 is a flow diagram for describing the print file method for data broadcasting printing according to an embodiment. Upon printing preparations being made, the DTV 101 which has obtained the actual printing contents data from the data broadcasting data issues a printing request job to the DTV printer 102 (step S401). In the event that the DTV printer 102 which has received the printing request job can accept the printing contents data, the DTV printer 102 sets a data sink region for receiving the printing contents data. Status information to the effect that printing can be performed is returned to the DTV 101 along with the information of the data sink (step S402).

The DTV 101 which has received the status information from the DTV printer 102 to the effect that printing can be performed transfers the printing contents data to the DTV printer 102 (Step S403). Note that transfer of the printing contents data is performed as an HTTP post process.

The DTV printer 102 stores the received printing contents data in the data sink region, and starts printing processing using the printing contents data. Details of printing processing will be described later.

Next, FIG. 5 is a flow diagram for describing the print URI method for data broadcasting printing according to an embodiment. With the print URI method, the DTV 101 does not obtain the actual printing contents data, but rater obtains address information, indicating where the printing contents data is saved (URI (Uniform Resource Indicator)), from the data broadcasting data. Upon printing preparations being made, the DTV 101 transmits the obtained URI information in the form of a printing request job to the DTV printer 102 (step S501). In the event that the DTV printer 102 which has received the printing request job is in a print-capable state, the DTV printer 102 obtains the actual printing contents data (structured document data and attached MonoMedia data) indicated by the URI based on URI information (step S502). Note that this obtaining of the printing contents data is performed as an HTTP get process. Upon obtaining the actual printing contents data (step S503), the DTV printer 102 starts printing processing. Details of printing processing will be described later.

Now, an overview will be given of printing structure document data (XHTML-Print and Print Profile) included in the printing contents data with the present embodiment.

XHTML-Print, which is given as the first structure document data, states printing data elements and attributes, and basically is of a format conforming to XHTML Basic specifications, but is characterized in that the number of types of elements that can be used is restricted as compared to XHTML Basic. For example, the frame element is not supported, and nesting of the table element is forbidden. Further, that the number of types of fonts that can be used is restricted. As a matter of course, XHTML-Print does not include any application-like descriptions such as forms and scripts, since XHTML-Print is positioned as printing data.

CSSPP, which is given as the second structure document data, states the layout of printing data, font size, and so forth. While CSSPP is conformant to CSS Level 2, CSSPP is restricted in the types of styles which can be used in comparison to CSS Level 2, and also is expanded such that printing layout can be specified. While the layout is basically "position: static" as with CSS for HTML, an absolute position specification where block elements are specified to "position: absolute" may be made. However, size specification cannot be made in increments of pixels, because the resolution of printers manufactured by various manufacturers are not all of the same resolution. Accordingly, absolute values can be specified only in absolute values such as "cm" and "mm" which are not dependent on resolution. Unique expansion functions include specification of sheet size, page numbers, headers and footers, and so on.

Figure 6:
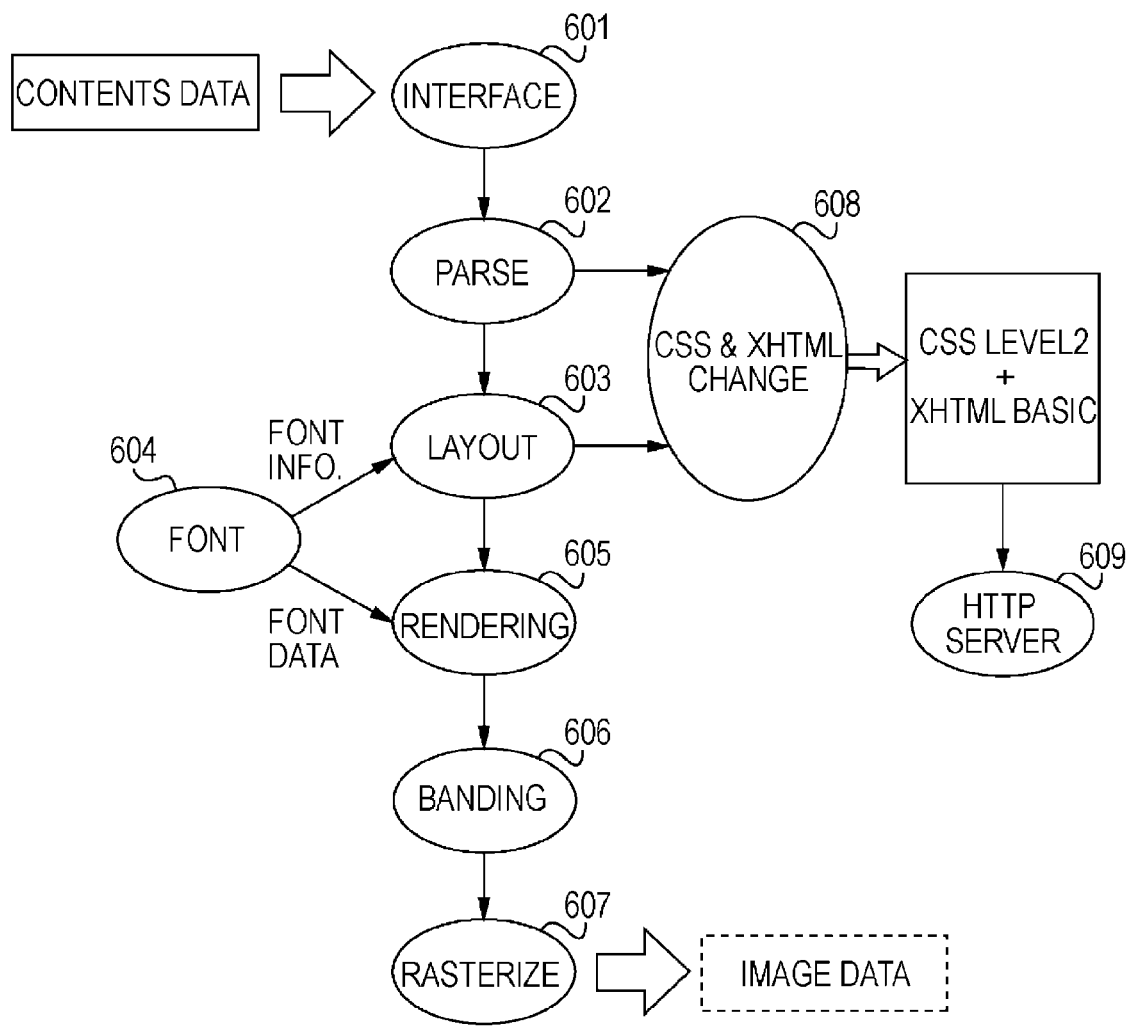
FIG. 6 is a diagram for describing processing executed at a network controller of the DTV printer shown in FIG. 3 according to an embodiment of the present invention.

Next, details of the printing processing which is a feature of an embodiment of the present invention will be described with reference to the drawings. FIG. 6 is a diagram illustrating the processing procedures for software processing executed by the network controller 301 of the DTV printer 102 according to an embodiment. Each function in a circle is to be understood to be equivalent to a software module in the following description. Also, parsing and rendering of structure document data described in a markup language, performed in the above-described data processing, is to be understood to be executed by software in an embodiment. However, that is not to say that the present invention is restricted to software processing, and any of the functions of the software modules described below may be implemented by hardware. Also, while FIG. 6 illustrates each process corresponding to a single module to facilitate description, each module does not necessarily have to be independent.

The printing content data transmitted from the DTV 101 is received by an interface module 601. The received printing contents data is handed to a downstream parsing processing module 602. While not shown in the drawings, the interface module 601 also has a function for obtaining inner status of the printer from the print controller 302, and transmitting this to the DTV 101 as printer status information. In the same way, the interface module 601 has a function for transmitting commands from the DTV 101 and commands from the network controller 301 to the printer controller 302.

Of course, an arrangement may be made wherein the interface module 601 obtains an URI indicating where the printing contents data is saved from the DTV 101, and receives the actual printing contents data based on the URI.

The parsing processing 602 is a module for parsing syntax of structured document data such as XHTML-Print files and CSSPP files. Specifications relating to layout that are obtained by parsing are also extracted.

The layout processing 603 is a module for creating page layout information so as to make physical page data out of the printing objects, based on the syntax information parsed by the parsing processing 602. For example, page break position information is created for forming page data, by applying style information obtained by parsing a CSSPP file to text in an XHTML-Print file and an image specified in an XHTML-Print file. A CSSPP file is referred to in generating of the layout.

Font processing 604 is a module for creating and managing font data specified primarily in the CSSPP file. Note that the font processing 604 is also called up for obtaining font information at the time of the layout processing 603 generating the page layout information.

The rendering processing 605 executes processing for performing calculation to form image data of objects provided in the form of numerical data such as vector data. The rendering processing 605 decodes JPEG format data into RGB bitmap data, enlarges or reduces the image so as to be adjusted to the size specified in the layout information, and so forth, for example.

The banding processing 606 divides the entire drawing region for a single page into multiple regions (bands). The banding processing 606 is processing for enabling the later rasterizing processing 607 to be drawn in increments of bands.

The rasterizing processing 607 is processing for generating printing image data using text included in the drawing region divided into increments of bands at the banding processing 606, the image data rendered at the rendering processing 605, and so forth. The rasterizing processing 607 completes generation of the final printing data. The printing image data generated at the rasterizing processing 607 is handed to the printer controller 302 shown in FIG. 3, and subjected to predetermined processing.

Now, processing performed at the printer controller 302 side will be described before describing the description changing processing 608 for CSSPP files and XHTML-Print files.

Figure 7:
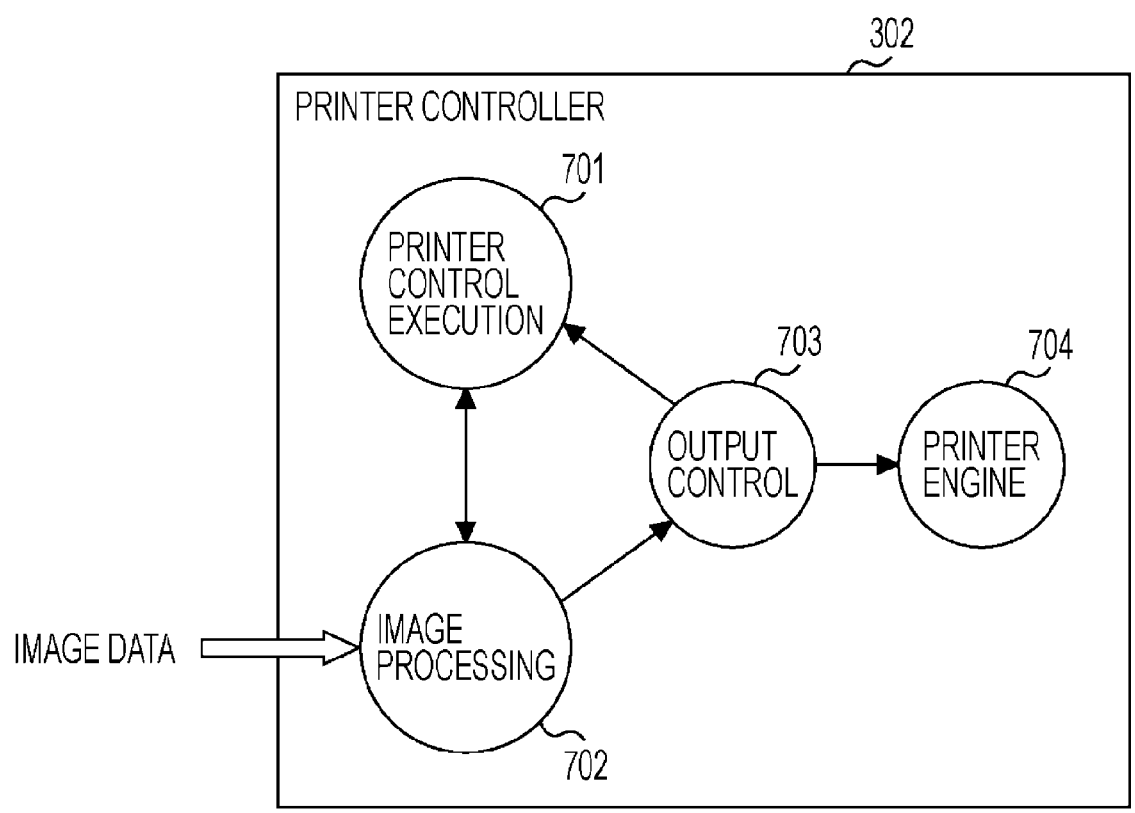
FIG. 7 is a diagram for describing processing executed at a printer controller of the DTV printer shown in FIG. 3 according to an embodiment of the present invention.

FIG. 7 is a diagram for describing software processing executed at the printer controller 302 of the DTV printer 102 according to an embodiment. With the exception of the printer engine 704, each module in a circle is to be understood to be equivalent to software processing in the following description. The printer engine used in the present embodiment is a system using an ink-jet serial printer. The printer controller 302 of the printer does not perform high-level image processing, but rather renders the printing image data at the memory of the printer controller 302, converts the rendered printing image data into a data format which can be processed at the printer engine, and executes printing.

The printer control execution processing 701 is a module for executing various types of control performed by the printer controller 302, as well as control for exchanging printer status information with the network controller 301.

The image processing unit 702 is a module for receiving the printing image data generated at the rasterizing processing 607 of the network controller 301, and executing image processing matching the output format of the printer engine. Image processing to be executed includes converting multi-level RGB image data into binary CMYK image data, and so forth.

The output control 703 is a module for performing output control such that the printing image data output from the image processing module 702 is of an output format corresponding to the printing processing to be executed at the printer engine 704. The printer engine 704 is a function module equivalent to the head driver 326 and motor drivers 328 and 330 shown in FIG. 3, and accordingly description thereof will be omitted here.

Now, returning to FIG. 6, the changing processing of printing structured document data, which is a feature of the present invention, will be described.

Reference numeral 608 denotes a description change processing module for changing the description contents of the printing structured document data, both CSSPP and XHTML-Print. As described above, the printing contents data used for data broadcasting printing includes the two structured document data of XHTML-Print and CSSPP. Each is described in a markup language, having a structure specially adapted to printing. A problem may occur in attempting to display these in a normal HTML browser, in that the display is incorrect, or in some cases no display can be made at all. This is because normal HTML browser engines are not capable of parsing structures specially adapted to printing that are unique to XHTML-Print and CSSPP.

Accordingly, the description changing processing module 608 executes processing for changing the description contents of XHTML-Print and CSSPP specially adapted to printing, such that a printing page preview display can be suitably made in an HTML browser. The processing at the parsing processing 602, layout processing 603, and description changing processing module 608, will be described by way of examples.

Figure 8:
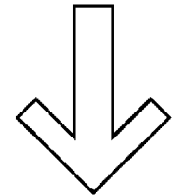
FIG. 8 is a diagram for describing description changing processing according to an embodiment of the present invention.

FIG. 8 is a diagram for describing the processing of the parsing processing 602 for extracting page layout information from a CSSPP file, and the description changing processing 608 for changing the description in CSSPP files and XHTML-Print files based on that layout information. Note that in this example described here, copies are generated of received CSSPP and XHTML-Print files, and description changing processing is made on the generated copy files.

In the CSSPP file, the description item which is unique to printing is the "@page" specification. Generally, printing is output in increments of pages, so a special box called a "page box" is used. A page box is made up of a "page region" and "margin". This "@page" specification which is equivalent to the page box enables values to be set for the size and orientation of the page box, and for the margin. FIG. 8 shows that a page region has been set with a margin of 3 mm in all directions, on an A4 size portrait sheet.

Also, the description of the style sheet can be classified by output destination. In FIG. 8, the font size has been specified differently for display (indicated by "screen") and for printing (indicated by "print").

At the parsing processing 602, the CSSPP file is parsed to extract layout information. First, the size and orientation of the of the above-described page box and the margin information are extracted from the "@page" specification. Next, font size information is extracted relating to "print" from the "@media" specification. The extracted information is handed to the description changing (CSS & XHTML Change) processing 608 along with the CSSPP file.

The description changing processing 608 performs description changing processing of the CSSPP file so as to convert into a CSS Level 2 file which the HTML browser engine can parse.

In the case shown in FIG. 8, the information of the page box, which is specially adapted to printing, is changed to a display compatible with browser display, in order to change the CSSPP into CSS Level 2 (hereafter referred to as "CSS2"). Specifically, the page box information is deleted, and new box region specification description is added. The CSS2 has the "@page" and "@media" information deleted, and a newly-defined "all" for specifying the box region. This box region restricts the page width in the horizontal direction to 210 mm with margins of 3 mm, but no restrictions in the vertical direction. This is because the display is to be made in an HTML browser. Also, the CSS2 is for printing preview, so the font size for "print" media is left at 9 pt.

Upon the CSS file description being changed as described above, the corresponding XHTML-Print file must also be changed. Accordingly, the XHTML-Print file is also handed to the description changing processing 608. The changes made to the CSS file as shown in FIG. 8 mean that the entire XHTML description needs to be surrounded with the box region defined by "all" in CSS2, in order to change the XHTML-Print file into XHTML Basic file format. Accordingly, with the XHTML Basic in FIG. 8, "all" is described for the "class" attribute, using the "div" element following the "body" element. Nesting the "div" element is not restricted, so adding to the XHTML-Print file poses no problem.

Thus, the description changing processing 608 uses the layout information extracted at the parsing processing 602 to change an CSSPP file in to a CSS2-compatible description. The XHTML-Print file is also changed into an XHTML Basic-compatible description along with the CSSPP file being changed.

Further, the description changing processing 608 performs processing for inserting the page break position into the CSSPP file and XHTML-Print file for printing preview display. In the case of XHTML-Print and CSSPP, "page-break-before" is provided as a properties for settings relating to page break control. Also provided are "page-break-after" for a page break immediately following an element including the property, and "page-break-inside" for a page break within an element including the property. These are all for specifying page breaks when printing onto sheets, and accordingly are applied only to printing. Consequently, HTML browser engines, which have no concept of pages, cannot parse this property, and it is needless to say that data displayed in an HTML browser does not include any description indicating page break positions.

To deal with this, the description changing processing 608 detects page break positions using the page-break-related property which the parsing processing 602 extracts, and adds information to the XHTML file and CSS file for making a display in the browser indicating the page break position. Thus, CSS2 and XHTML files compatible with XHTML Basic, which has no concept of page break position, can be displayed in an HTML browser in a manner such that the user can visually recognize the page break position.

Also note that there are CSSPP files which do not use the page-break-related property. In such cases, the page break position should be calculated from the layout information in increments of pages which the layout processing 603 has processed, and the above-described page break display description added to that position.

Figure 9:
FIG. 9 is a diagram illustrating an example of a CSS file and XHTML file subjected to description alteration processing according to an embodiment of the present invention.

FIG. 9 is an example of a CSS file and XHTML file which has been subjected to the description changing processing relating to page break, as described above. The "border" property is described in the CSS file which has been changed into the CSS2 format, in order to display a border line of a sort at the detected page break position, to let the user know that this is a page break position. Also, a description for displaying text information of "page break" at the border line position is added to the XHTML file which has been changed into the XHTML Basic format. Thus, the preview image of the printing data displayed in the HTML browser shows the border line and text stating "page break" as shown in FIG. 9 as an example of browser display.

Returning to FIG. 6, the above-described description changing processing 608 changes the CSSPP file and XHTML-Print file into CSS2 and XHTML Basic compatible structured document data for preview. At the HTTP server processing 609, the CPU 311 of the network controller 301 executes processing for uploading the structured document data for preview and related MonoMedia data to an HTTP server (not shown) implemented in the DTV printer 102.

Hereafter, the term "preview contents data" refers to a data group including at least structured document data for preview.

As described above, generating preview contents data is realized by changing the description contents of printing structured document data into structured document data for preview. This does not involve generating a preview image based on printing data generated by rendering, so the amount of processing time required for previewing can be greatly reduced. Also, there is no need to perform rendering processing and image data storage, so existing hardware resources such as memory are sufficient for generating the preview contents data.

Display Processing of Preview Contents Data

Next, description will be made regarding processing for displaying the print preview at the DTV 101. There is an increasing number of DTV models which have general-purpose HTML browsers in addition to a BML browser for displaying data broadcasting. While many models used to provide the two browsing functions by installing an application independently from the BML browser, an increasing number of models have a configuration wherein a BML browser and HTML browser are run on a single core engine, due to the need to increase efficiency of resources within the device. Accordingly, there is currently developing an environment wherein BML contents and HTML contents can be seamlessly operated.

As long as an HTML-compatible browser is installed, structured document data in XHTML Basic and CSS2 can displayed. Accordingly, the preview contents data generated with the above-described description changing processing can be displayed by the HTML browser in the DTV 101.

Figure 10:
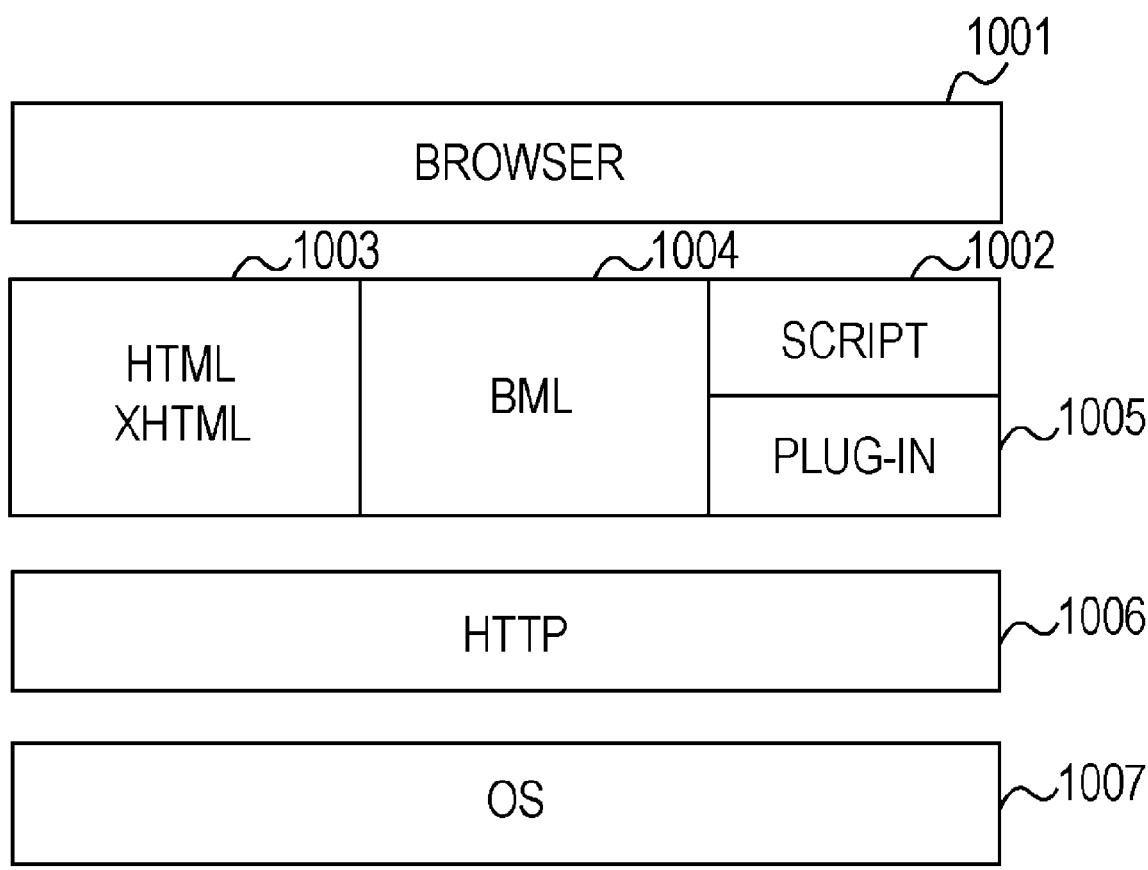
FIG. 10 is a conceptual diagram illustrating an application layer implemented in the DTV according to an embodiment of the present invention.

FIG. 10 is a conceptual diagram illustrating application layers implemented in the DTV 101. The upper most layer is a browser application layer, to which a browser 1001 corresponds. The next layer is a browser engine layer, to which script 1002, HTML/XHTML 1003, BML 1004, and Plug-in 1005 correspond. The next layer is an interface layer, to which HTTP 1006 corresponds. The operating system (OS) 1007 corresponds to the lowermost layer.

The BML 1004 is a browser engine corresponding to data broadcasting BML. The browser engine of the BML 1004 can display data broadcasting standardized by the ARIB. The HTML/XHTML 1003 is a browser engine corresponding to the HTML and XHTML of Internet contents, and accordingly this engine can display normal Internet contents. Further provided are engines such as script 1002 which executes various types of scarps, Plug-in 1005 corresponding to plug-ins, and so forth. The DTV 101 according to the present embodiment is capable of displaying both data broadcasting BML contents and Internet contents in a single browser.

Figure 11:
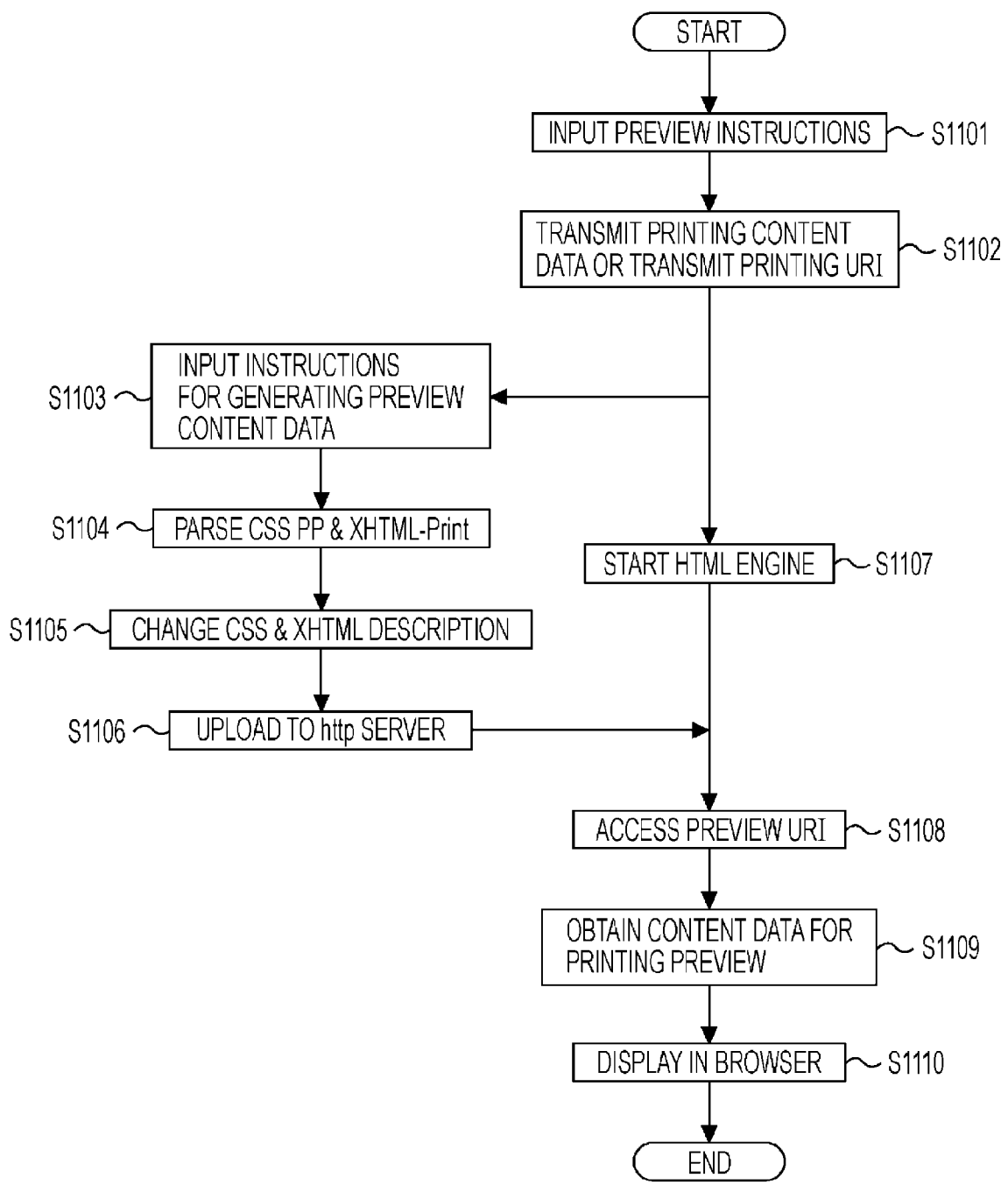
FIG. 11 is a process flowchart illustrating printing preview display processing according to an embodiment of the present invention.

FIG. 11 shows a processing flowchart of preview display processing according to an embodiment. In the processing flowchart illustrated in FIG. 11, both the processing at the DTV 101 side and the processing at the DTV printer 102 side are shown. Note that in FIG. 11, steps S1101, S1102, S1107, S1108, S1109, and S1110 are steps executed at the DTV 101, while steps S1103, S1104, S1105, and S1106 are steps executed at the printer 102. Step S1102 is shown splitting to step S1103 and step S1107, but this does not imply that one or the other is exclusively selected based on some sort of determination having been made; rather, this illustrates that, following step S1102, step S1107 is executed at the DTV 101 and step S1103 is executed at the printer 102. In either device, the processing shown is executed by the CPUs 201 and 311 installed in the respective apparatuses for control thereof.

Now, description will be made following the processing flowchart. First, in a state with data broadcasting contents displayed in the browser, the user performs an operation to press a "preview" button displayed on the browser screen, using a remote controller device or the like. As a result of this operation, the DTV 101 accepts input of a preview instruction (step S1101).

Figure 12:
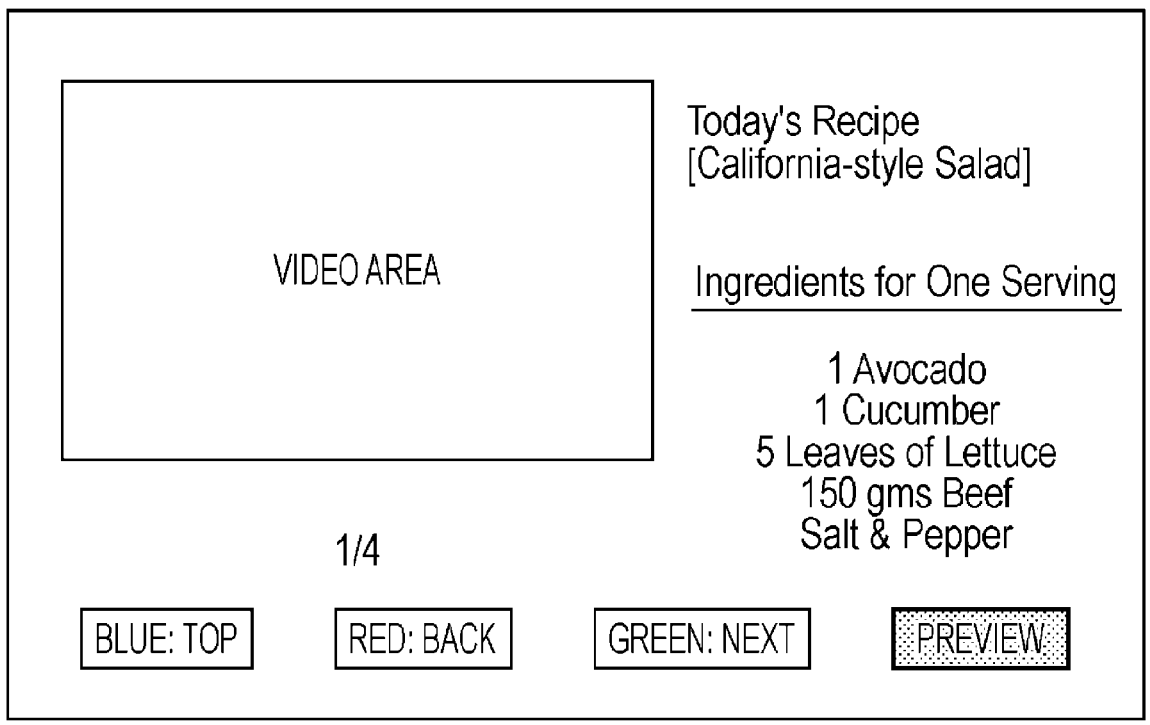
FIG. 12 is a diagram illustrating a state of displaying data broadcasting contents in a browser using a BML engine according to an embodiment of the present invention.

FIG. 12 shows a state in which the data broadcasting contents are displayed in the browser using the BML engine. Four buttons of four colors are displayed on the screen, with the preview button being of the color yellow.

Upon accepting the input of the preview instruction, the CPU 201 of the DTV 101 transmits the actual printing contents data or a URI indicating where the printing contents data is saved, transmitted to the DTV printer 102 along with the data broadcast (step S1102). Also, a preview instruction command is issued to the DTV printer 102, so as to execute printing preview processing at the DTV printer 102.

The DTV printer 102 which has received the preview instruction command and actual printing contents data or URI indicating where the printing contents data is saved from the DTV 101 inputs the print instruction command (step S1103). While not shown as a control step in particular, in the event of receiving a file of actual printing contents data, generating of preview contents data is started using the actual file. Also, in the event of actual receiving a URI indicating where the printing contents data is saved, processing for obtaining the actual printing contents data is started according to the processing described with reference to FIG. 5, using the URI.

Next, the DTV printer 102 executes parsing processing of the obtained XHTML-Print file and CSSPP file, based on the preview instruction command input in step S1103 (step S1104). Processing in this step is equivalent to the parsing processing 602 shown in FIG. 6.

Following parsing, the DTV printer 102 executes description changing processing of the XHTML-Print file and CSSPP file (step S1105). Processing in this step is equivalent to the description changing processing 608 shown in FIG. 6.

Next, the DTV printer 102 uploads the preview contents data generated by the description changing processing in step S1105 (the data group including the previewing XHTML file and CSS file) to the HTTP server of the DTV printer 102 (step S1106). Processing in this step is equivalent to the HTTP server processing 608 shown in FIG. 6.

Following receiving input of preview instructions from the user in step S1101, the DTV 101 activates the HTML browser engine 1103 (step S1107). This is performed for parsing the preview contents data generated by the DTV printer 102 and displaying in the browser.

Following activating the HTML browser engine 1103, in step S1106 the DTV 101 accesses the HTTP server to obtain the preview contents data uploaded to the HTTP server in step S1106 (step S1108). Specifically, the file path of the XHTML file which is the preview contents data, i.e., the URI, is accessed.

Note that a URI for accessing the preview contents data is agreed on beforehand before the DTV 101 and DTV printer 102. While various arrangements can be conceived for this agreement, with the present embodiment, a URI for accessing the preview contents data is set in the DTV printer 102 prior to shipping. Upon connecting the DTV printer 102 with the DTV 101 via a network, the DTV printer 102 notifies the DTV 101 of various setting values, and also the above URI. The DTV 101 stores the URI notified thereto in an arbitrary memory region. This stored URI is used when the DTV 101 accesses the HTTP server in step S1108. Of course, in the event that a printing preview instruction is issued from the DTV 101, the DTV printer 102 holds the generated XHTML file in the HTTP server so as to be accessible using the URI.

Next, the DTV 101 obtains the preview contents data (step S1109). At this time, in the event that an attribute specifying MonoMedia such as a JPEG image or the like is described in the XHTML file, the specified MonoMedia is obtained as well. Finally, the obtained preview contents data is processed by the HTML browser engine, so as to be displayed in the browser as a printing preview (step S1110).

Figure 13:
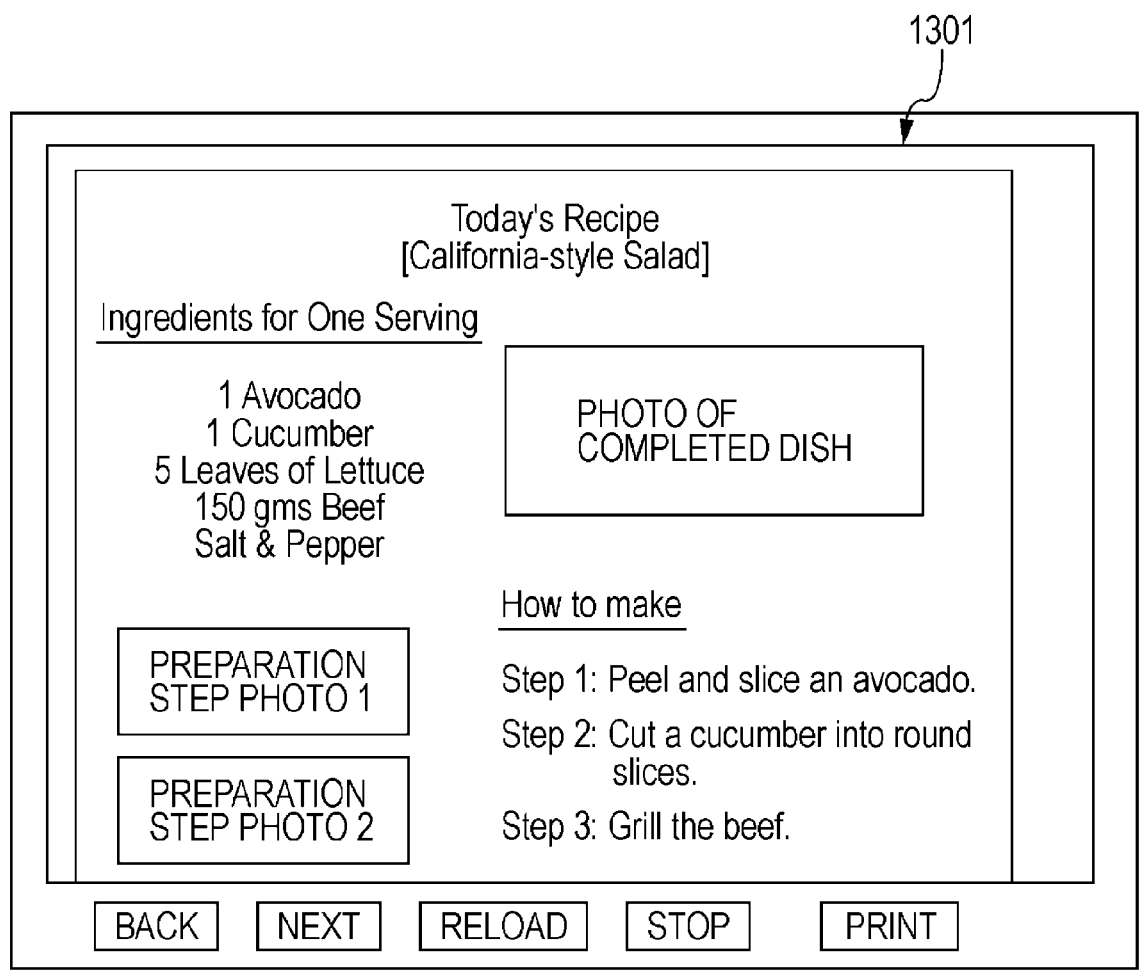
FIG. 13 is a diagram illustrating a case of displaying a print preview in a browser according to an embodiment of the present invention.

FIG. 13 is a diagram illustrating displaying of a printing preview in the browser 1001. A browser screen 1301 is displayed on the monitor of the DTV 101, and the preview generated based on the obtained printing preview contents data is displayed within the browser screen 1301. The user can check the displayed printing preview, and then press a "print" button displayed on the browser by operating a remote controller or the like. Upon the DTV 101 issuing a printing instruction command to the DTV printer 102, the printing data is generated using the printing contents data already transmitted to the DTV printer 102 (the data group including the XHTML-Print file and CSSPP file).

As described above, with the system configured of the DTV 101 and DTV printer 102, the DTV printer 102 generates preview contents data from the printing contents data. This preview contents data enables XHTML and CSS which is specially adapted to printer to be displayed in the browser installed in the DTV 101, and further, page break information has been added to be used for printing previewing. The DTV 101 obtains the XHTML which the DTV printer 102 generates and uploads to the HTTP server, so as to be displayed in the HTML browser, thereby providing the user with a suitable printing preview image.

That is to say, when printing data broadcast data in digital broadcasting, before performing printing output of printing data generated from printing structured document data described in a markup language, a preview display can be made of the printing data using the browser function of the digital TV.

It should be noted that while the configuration of the DTV printer 102, and particularly the configuration shown in FIG. 6, has all been described in terms of software modules, but the present invention is not restricted to this arrangement. Configurations such as the parsing processing 602 and description changing processing 608 can be implemented as hardware.

Also, with the DTV 101 according to the present embodiment, a configuration has been described wherein the HTML/XHTML browser engine 1003 and BML engine 1004 use a common browser 1001, but the present invention is not restricted to this arrangement, and the present invention is applicable to cases wherein browsers are provided corresponding to each browser engine.

Also, description of the embodiment has been made with an example wherein, upon a printing preview instruction command being issued from the DTV 101, the DTV printer 102 performs the processing for converting the printing contents data into preview contents data, but the present invention is not restricted to this arrangement, and an arrangement may be made wherein, upon a printing preview instruction command being issued from the DTV 101, the user is prompted to view a preview before executing actual printing processing at the DTV printer 102. In this case, a preview XHTML file and CSS file are generated based on the printing XHTML-Print file and CSSPP file, and displayed at the browser of the DTV 101. In the event that the user inputs a command to go ahead with printing of the preview contents to the DTV printer 102, processing for generating printing data from the received printing XHTML-Print file and CSSPP file is executed. Thus, cases of printouts which the user does not want being printed out can be reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-287449 filed Oct. 23, 2006, which is hereby incorporated by reference herein in its entirety.

What is claimed is:

1. A printing apparatus communicably connected to a broadcast receiver for receiving data broadcasting, and capable of performing data broadcast printing provided using data broadcasting, said printing apparatus comprising:
    a reception unit configured to receive, from the broadcast receiver, printing structured document data, or address information indicating a saved location of the printing structured document data;
    an obtaining unit configured to obtain printing structured document data using the address information in the event of the reception unit receiving the address information indicating a saved location of the printing structured document data;
    a parsing unit configured to parse a cascading style sheet profile included in the printing structured document data received by the reception unit or obtained by the obtaining unit, and extracting layout information relating to printing therefrom; and
    a changing processing unit configured to change printing-related description contents included in the printing structured document data into a description which is parsed by a browser application installed in the broadcast receiver and capable of displaying markup language, using the layout information,
    wherein the printing structured document data includes first structured document data stipulating elements and attributes of printing data, and second structured document data stipulating at least the layout of printing data, the second structured document data comprising the cascading style sheet profile,
    and wherein the parsing unit extracts the layout information by parsing the second structured document data,
    and wherein the changing processing unit changes the printing-specific description contents included in the first structured document data and the second structured document data, into description contents compatible with display by the browser application, using layout information extracted with the parsing unit.

2. The printing apparatus according to claim 1, wherein the changing processing unit adds a description to the first structured document data and the second structured document data, indicating a page break.

3. The printing apparatus according to claim 1, further comprising an uploading unit configured to upload the first structured document data and the second structured document data of which the description has been changed by the changing processing unit, to a server, to enable access from the broadcast receiver.

4. A printing method for a printing apparatus communicably connected to a broadcast receiver for receiving data broadcasting, and capable of performing data broadcast printing provided using data broadcasting, the method comprising:
    receiving, from the broadcast receiver, printing structured document data or address information indicating a saved location of the printing structured document data;

obtaining printing structured document data using the address information in the event of receiving the address information indicating a saved location of the printing structured document data;

parsing a cascading style sheet profile included in the printing structured document data received in the receiving step or obtained in the obtaining step and extracting layout information relating to printing; and changing printing-related description contents included in the printing structured document data into a description which is parsed by a browser application installed in the broadcast receiver and capable of displaying markup language, using the layout information, wherein the printing structured document data includes first structured document data stipulating elements and attributes of printing data, and second structured document data stipulating at least the layout of printing data, the second structured document data comprising the cascading style sheet profile, and wherein the layout information is extracted by parsing the second structured document data, and wherein the printing-specific description contents included in the first structured document data and the second structured document data are changed, in the changing processing, into description contents compatible with display by the browser application, using layout information extracted in the parsing.

5. The printing method according to claim 4, wherein a description is added to the first structured document data and the second structured document data in the changing processing, indicating a page break.

6. The printing method according to claim 4, further comprising uploading the first structured document data and the second structured document data of which the description has been changed in the changing processing, to a server, so as to enable access from the broadcast receiver.

* * * * *